July 28, 1964
W. R. MASON
3,142,127
APPARATUS FOR CASTING FISHING BAIT
Filed May 11, 1962
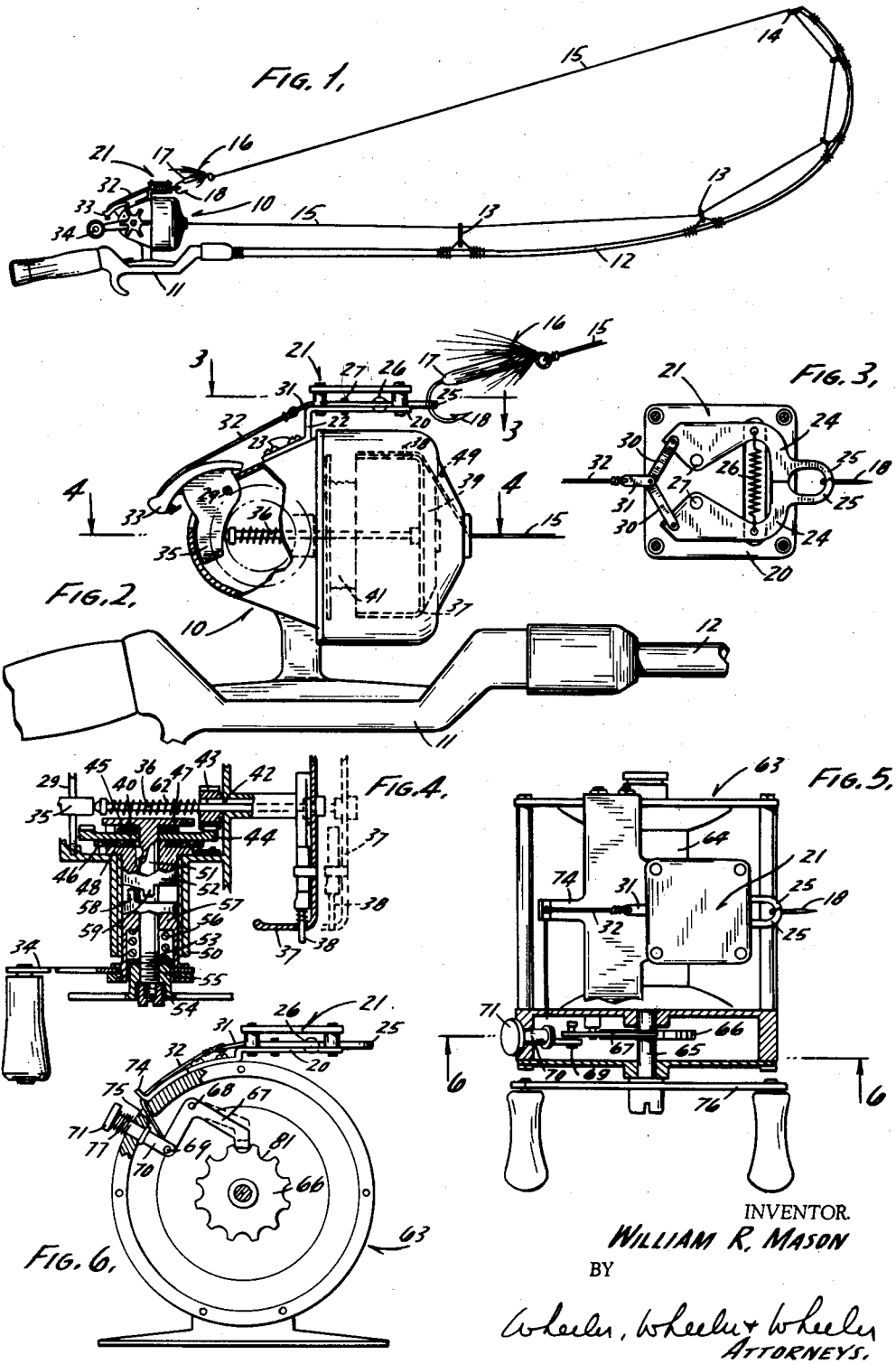
INVENTOR.
WILLIAM R. MASON
BY
Wheeler, Wheeler + Wheeler
ATTORNEYS.

United States Patent Office 3,142,127
Patented July 28, 1964

3,142,127
APPARATUS FOR CASTING FISHING BAIT
William Reid Mason, 291 Starr St., Fond du Lac, Wis.
Filed May 11, 1962, Ser. No. 193,971
6 Claims. (Cl. 43—19)

This invention relates to apparatus for casting fishing bait.

Previously known bait casting technique and apparatus typically involves swinging the fishing rod through a substantial arc to impart sufficient momentum to the casting weight or bait to project the weight or bait into a flight pattern destined to reach the target. Considerable skill is required to accurately cast according to this previous technique and each fisherman requires a substantial area within which the rod may be swung in its arc. Where several fishermen are casting from a dock or a boat, interference between the fishermen and their equipment almost inevitably occurs, with resultant confusion and possible hazard to the safety of the fishermen.

According to the present invention, the bait is projected into flight under the resilient bias of the fishing rod, which is bent into an arc and the bait then released to be projected under the resilient bias of the rod as it straightens. No movement of the rod butt is required in the course of casting the bait and no interference occurs between closely adjacent fishermen. A group of fishermen can cast simultaneously from a dock or from a boat with minimal interference therebetween or hazard thereto. The use of apparatus embodying the present invention makes it possible to cast while holding the fishing rod through the porthole of a ship.

In preferred embodiments of the invention, the fishing rod is provided near its butt end with a line coupling having a latch releasably engageable with the bait hook or the like on the fishing line. The hook is engaged with the latch and the line is drawn in on the reel to bow the rod resiliently into an arc. This stores energy in the bowed rod. The fisherman then aims the rod toward the target and a trigger connected to the latch is actuated to open the latch, thus releasing the line from the coupling and permitting the bowed rod to cast or project the bait into its flight pattern toward the target.

In preferred embodiments of the invention, the reel has a brake, which is set when the rod is bowed. The latch trigger is also connected to the reel brake for the coordinated release of the latch and the brake. Accordingly, after the bait has been projected into its flight pattern, the reel brake is disengaged to release the line to be drawn out behind the bait.

Two somewhat different types of reels are illustrated in this application. Such illustration is purely for purposes of exemplification, as the invention is not limited to any particular reel construction.

Other objects, advantages and features of the invention will appear from the following disclosure in which:

FIG. 1 is a side elevation of fishing apparatus embodying the present invention as applied to a spin-casting reel and showing the rod bowed into a bait casting arc.

FIG. 2 is a greatly enlarged view of the butt end of the rod and the reel portion of the apparatus shown in FIG. 1, parts of the reel housing being broken away and shown in cross section, other parts of the reel being shown in phantom.

FIG. 3 is a fragmentary cross section taken along line 3—3 of FIG. 2.

FIG. 4 is a fragmentary cross section taken along line 4—4 of FIG. 2.

FIG. 5 is a plan view of an open-thumb casting reel employed in apparatus embodying the invention.

FIG. 6 is a cross section taken along the line 6—6 of FIG. 5.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The embodiment of the invention shown in FIGS. 1–4 shows the invention as adapted to a spin-casting reel. The embodiment shown in FIGS. 5 and 6 shows the adaptation of the invention to an open thumb casting reel. As before indicated, the invention is not limited to any particular kind of reel and can be used with casting reels, spinning reels and spin-casting reels, etc.

In FIGS. 1–4, a conventional spin-casting reel 10 is mounted on the reel pad 11 of a conventional fishing rod 12, which is resilient. The rod 12 is provided with the usual line guide eyelets 13 disposed intermediate its ends and a tip eyelet 14. The line 15 is provided at its end with a bait 16, which includes a casting weight 17. The bait also has a fish hook 18.

According to the present invention, a line coupling 21 is provided on the rod 12 near its butt end. In the preferred embodiment shown in the drawings, the coupling 21 is mounted on the reel 10 by means of bracket 22 secured to the reel by screws 23. The line coupling 21 may consist of a bracket plate 20, to which latch levers 24 are pivotally connected on the pins 27. Levers 24 have coacting jaws 25 which are normally biased by the tension spring 26 towards closed position about the bait hook 18.

The latch levers 24 have their ends at the side of the pins 27 opposite jaws 25 interconnected by draw links 30 mutually connected to a coupling 31 for release lanyard 32 which is fastened to a thumb-actuated trigger 33 on reel 10. When the trigger 33 is depressed, lanyard 32 will draw on the links 30 to pivot the latch levers 24 about their pins 27 and open the jaws 25 to release the hook 18.

The reel 10, which is conventional except for the addition of the line coupling 21, has a brake which will hold the rod 12 in its bowed position, as shown in FIG. 1, when the crank 34 is appropriately manipulated. When the trigger 33 is depressed, the latch jaws 25 will first be released to permit the energy stored in the bowed rod to project the bait 16 into its flight pattern. Continued pressure on the trigger 33 will disengage the reel brake to release the line to be easily paid out behind the flying bait.

Although the construction of the reel 10 per se is no part of the present invention, details of the braking apparatus in a conventional spin casting reel are shown in FIGS. 2 and 4 of the instant drawings.

The trigger 33 is pivotally mounted on pin 29 and has a lever arm 35, which bears axially on stem 36. Stem 36 is biased rearwardly by spring 62 and carries at its end opposite trigger 33 a cup-shaped bail carrier 37 having a retractable bail pin 38 which is projected to its full line position shown in FIG. 4 when the line is wound on stationary reel spool 41, and which is retracted to its broken line position in FIG. 4 during casting. The specific details of the bail pin retractor are immaterial to the present invention. Such details are shown in U.S. Patents 2,991,957; 3,028,115 and 3,059,873; for example.

The stem 36 has a splined connection at 42 to a pinion 43 which meshes with ring gear 44. Ring gear 44 has a disk-shaped hub 40 disposed between friction brake discs 45, 46. These brake discs are variably pressed against the ring gear hub 40 to impose varying degrees of braking pressure thereon under the axial pressure of pressure disc 47 and pressure disc 48. A similar construction is shown in British Patent 819,008 of August 26, 1959.

Pressure disc 47 is mounted on stem 51 and pressure disc 48 is mounted on sleeve 52, which may turn in tubular crank housing 50 on the reel 10. Stem 51 has a threaded end 53, upon which a brake wheel 54 is adjustably mounted. As brake wheel 54 is turned to advance its hub 55 on the threads 53, spring 56 will be compressed to urge inwardly the clutch sleeve 57 which imposes pressure through its clutch lug 58 on the pressure disc sleeve 52 which has a corresponding clutch lug 59. With brake wheel 54 at least partially tightened, pressure discs 47 and 48 are drawn toward one another and friction discs 45, 46 will clamp against the ring gear hub 40. So long as pinion 43 is in splined connection with the stem 36 and bail pin 38 projects as shown in full lines in FIG. 4, the line 15 will be subject to the brake.

However, when the stem 36 is moved axially under pressure of the trigger 33, spline 42 disengages from pinion 43 to release the stem 36 and the bail 37 to freely rotate, thus releasing the line to be paid out freely behind the flying bait. Axial movement of the stem 36 also retracts bail pin 38, as shown in dotted lines in FIG. 4.

When the bait reaches the target, additional pressure on trigger 33 engages braking surface 39 on bail cup 37, with corresponding surface 49 on the reel housing and bail pin 38 is concurrently projected to full line position to brake the line and drop the bait on target.

To utilize the apparatus of the present invention to cast, the fisherman first engages the line hook 18 in closed latch jaws 25 and turns the handle 34 of the reel. The trigger 33 is concurrently released so that the spring 62 about stem 36 engages the spline 42 of stem 36 with the pinion 43, thus retracting the bail 37 and projecting bail pin 38 to full line position, as shown in FIG. 4.

Winding motion on crank 34 is transmitted to sleeve 52 through the clutch lugs 58, 59. The pressure of the brake pads 45, 46 on the hub 40 of ring gear 44 results in ring gear rotation and corresponding rotation of the pinion 43, stem 36, bail 37 and pin 38, thus to wind the line 15 on the reel 41. When all the slack has been removed from the line, continued rotation of the crank 34 will bow the rod into its arced position shown in FIG. 1. If the brake pads 45, 46 are under insufficient compression to bow the rod to the desired extent, brake wheel 54 is simply advanced far enough to increase the tension on spring 56 to produce the desired braking pressure on the pads 45, 46.

The fisherman now aims the rod toward the target. It is noted that the fisherman need use only one hand for this purpose. The fisherman's thumb is on the trigger 33. After aim has been taken, casting is accomplished by depressing the trigger 33. This pulls on the lanyard 32 to release the latch and the bait is projected into flight. Continued movement of the trigger releases the reel brake as aforestated so that the line can easily pay out behind the flying bait. The lanyard length is adjusted to insure sequential release of the latch prior to release of the brake.

Casting according to the present invention has been found to be very much more accurate, even for experienced fisherman. An inexperienced person can cast accurately almost immediately. Moreover, the casting range can be materially increased. The energy stored in the bowed rod is sufficient to project the bait as far as one hundred and fifty feet in experimental uses of the invention. As aforestated, the fisherman does not have to swing the rod through an arc and, accordingly, a group of fishermen can be bunched together at close range and all can cast at will without confusion or mutual interference.

FIGS. 5 and 6 show a modified form of the invention as applied to an open-thumb casting reel. The line coupling 21 is substantially the same as hereinbefore described. Like parts are given identical reference characters.

The reel 63 has a rotating spool 64 mounted on shaft 65 which is provided with a peripherally notched wheel 66. The spool 64 may be locked in position by a brake arm 67, which is mounted on pivot pin 68 and is pivotally connected by pin 69 to a trigger plunger 70 having a trigger button 71. The lanyard 32 of the latch may be threaded through a centering eyelet 74, and thence through an opening 75 in the reel casing 78. The end of the lanyard is terminally connected to the plunger 70.

The crank 76 of reel 63 is manipulated as aforestated after the bait hook 18 is engaged by the latch jaws 25 to wind the line onto the windlass 64 and to bow the rod. Latch arm 67 locks into one or another of the peripheral grooves 81 on the wheel 66 to brake the reel. When it is desired to cast, the plunger 70 is pressed against the bias of return spring 77, first to disengage the latch jaws 55 from the hook 18 to release the bait for projection into flight, and on continued movement of the latch plunger 70 to release the star wheel 66 to permit the windlass 64 to unwind as the line is paid out.

I claim:
1. In casting apparatus including an elongated resilient fishing rod having a butt and a tip with a tip eyelet, a reel mounted on the rod near its butt, a fish line wound on the reel and threaded through said tip eyelet and a casting weight near the end of the line and beyond said tip eyelet,
  (a) line coupling means on the rod near its butt for releasably securing the line near its end,
  (b) said reel comprising means for reeling in on the line and imposing sufficient tension on the line to resiliently bow the rod into an arc,
  (c) said line coupling comprising a latch, the release of which will free the line from the coupling and permit the bowed rod to cast the weight,
  (d) and a trigger for said latch by which a fisherman controls release of the latch.

2. The apparatus of claim 1 in which the reel further comprises a line brake, and means connecting said trigger to said brake for the coordinated release of the latch and the brake in sequence.

3. The apparatus of claim 1 in which the line is provided with a hook, said latch being releasably engageable with said hook, resilient means normally biasing said latch closed, and means for opening said latch to release the hook, said means including a motion transmitting connection to said trigger.

4. The apparatus of claim 3 in which the reel comprises a line brake, means mounting said latch on the reel and means connecting said trigger to said brake for the coordinated release of the latch and the brake in sequence.

5. In apparatus for casting fishing bait and including a rod, a reel and a line adapted to be tensioned to bow the rod into an arc, the combination of a reel having a line brake, a line coupling mounted on the reel, said line coupling including a releasable latch for releasably securing one end of the line when the line is tensioned between the latch and line brake to bow the rod into an arc, a trigger, and release means actuated by said trigger coordinating the release in sequence of the latch first and the brake next.

6. The combination of claim 5 in which said latch is provided with resilient means normally biasing said latch closed, said release means comprising a motion transmitting connection from said trigger to said latch to open it against the bias of said resilient means.

References Cited in the file of this patent
UNITED STATES PATENTS

| | | |
|---|---|---|
| 2,593,885 | James | Apr. 22, 1952 |
| 2,765,568 | Kozar | Oct. 9, 1956 |
| 2,862,679 | Denison et al. | Dec. 2, 1958 |

FOREIGN PATENTS

| | | |
|---|---|---|
| 819,008 | Great Britain | Aug. 26, 1959 |
| 827,107 | Great Britain | Feb. 3, 1960 |